Feb. 26, 1952  E. T. MORTON  2,586,853
MULTIPLE TEMPERATURE REFRIGERATOR
Filed Jan. 3, 1947  8 Sheets-Sheet 1

Feb. 26, 1952 E. T. MORTON 2,586,853
MULTIPLE TEMPERATURE REFRIGERATOR
Filed Jan. 3, 1947 8 Sheets-Sheet 2

Inventor:
Evans T. Morton
By Hinkle, Morton, Ahlberg, Hansmann & Wupper
Attorneys.

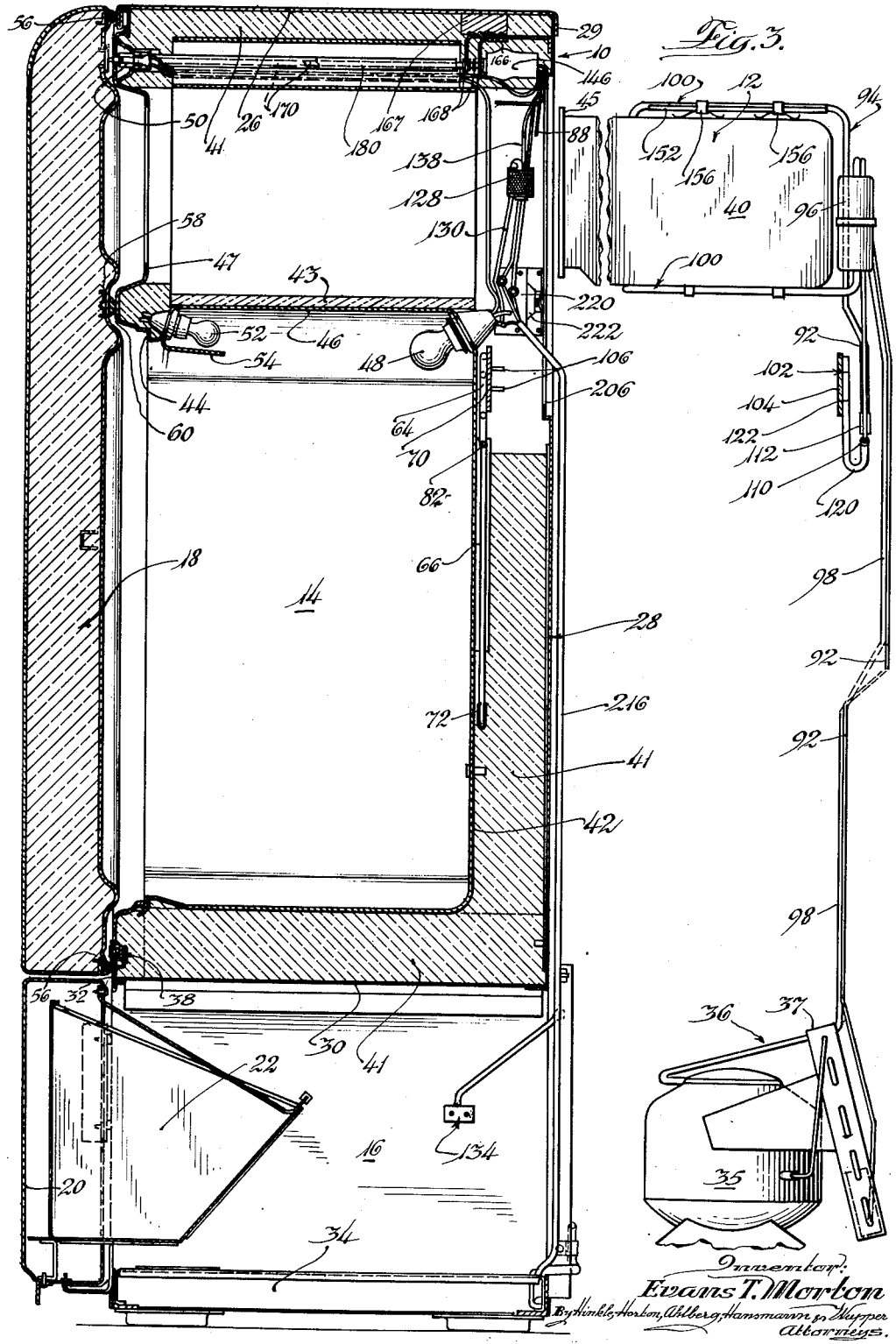

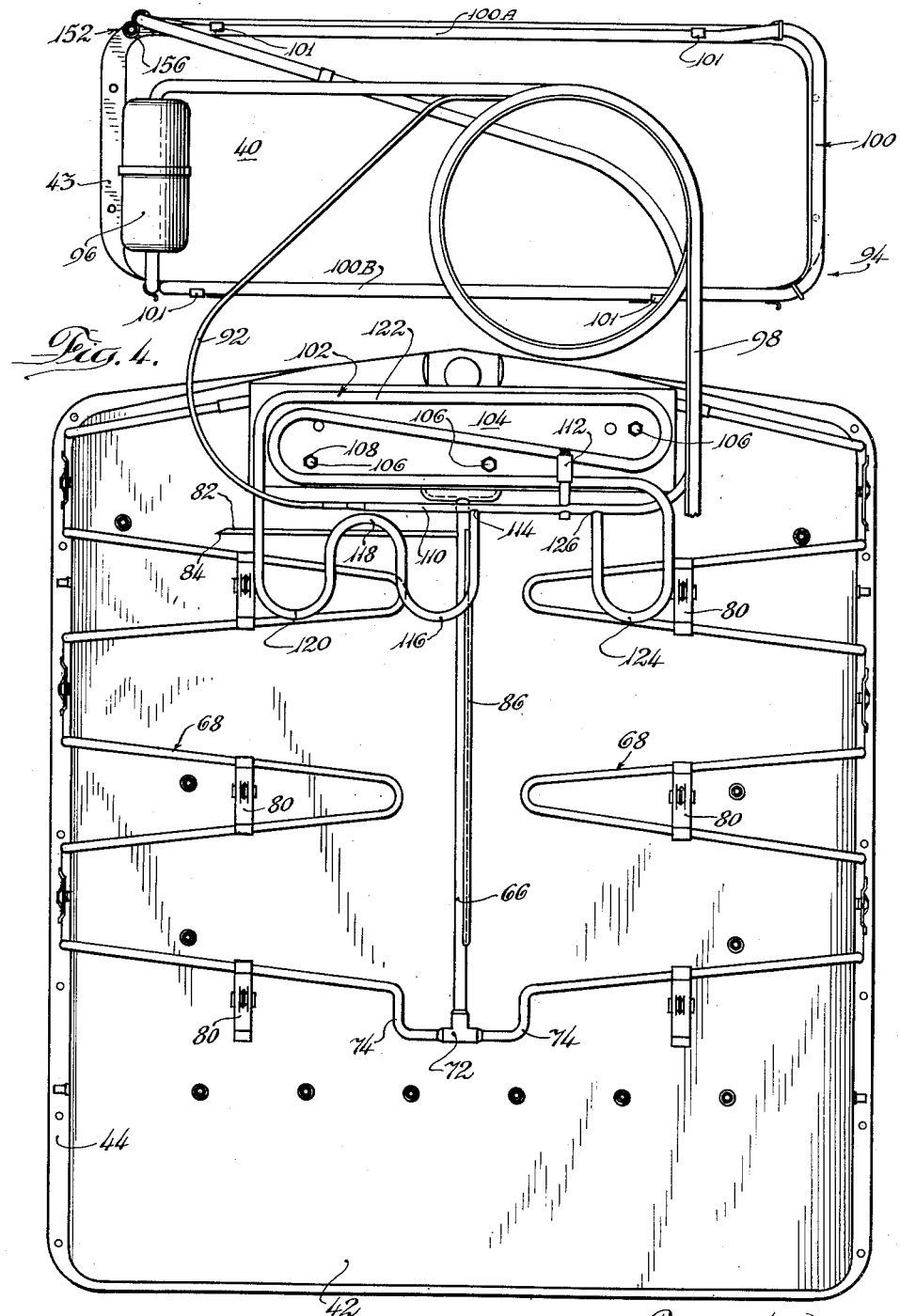

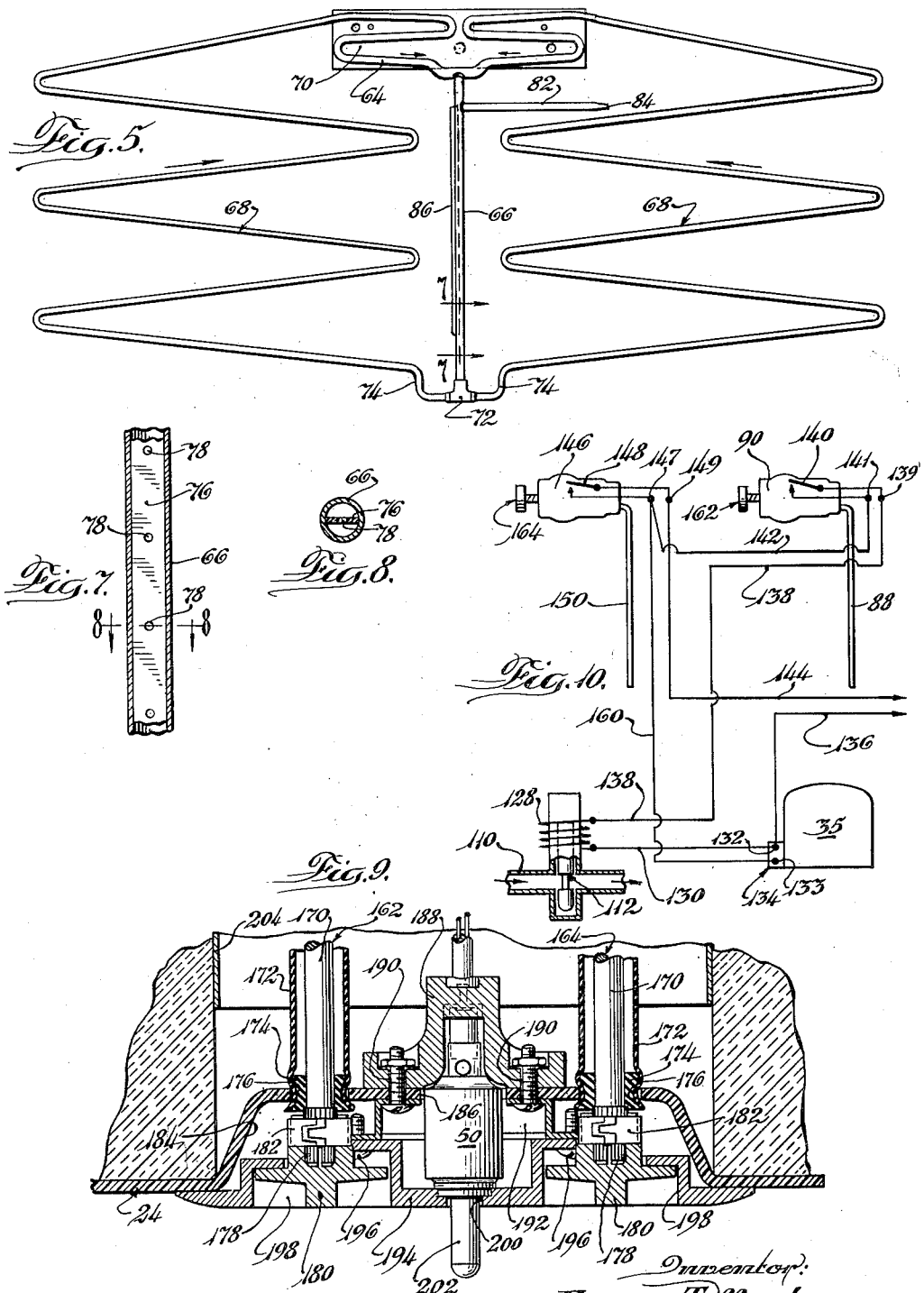

Feb. 26, 1952  E. T. MORTON  2,586,853
MULTIPLE TEMPERATURE REFRIGERATOR
Filed Jan. 3, 1947  8 Sheets-Sheet 6
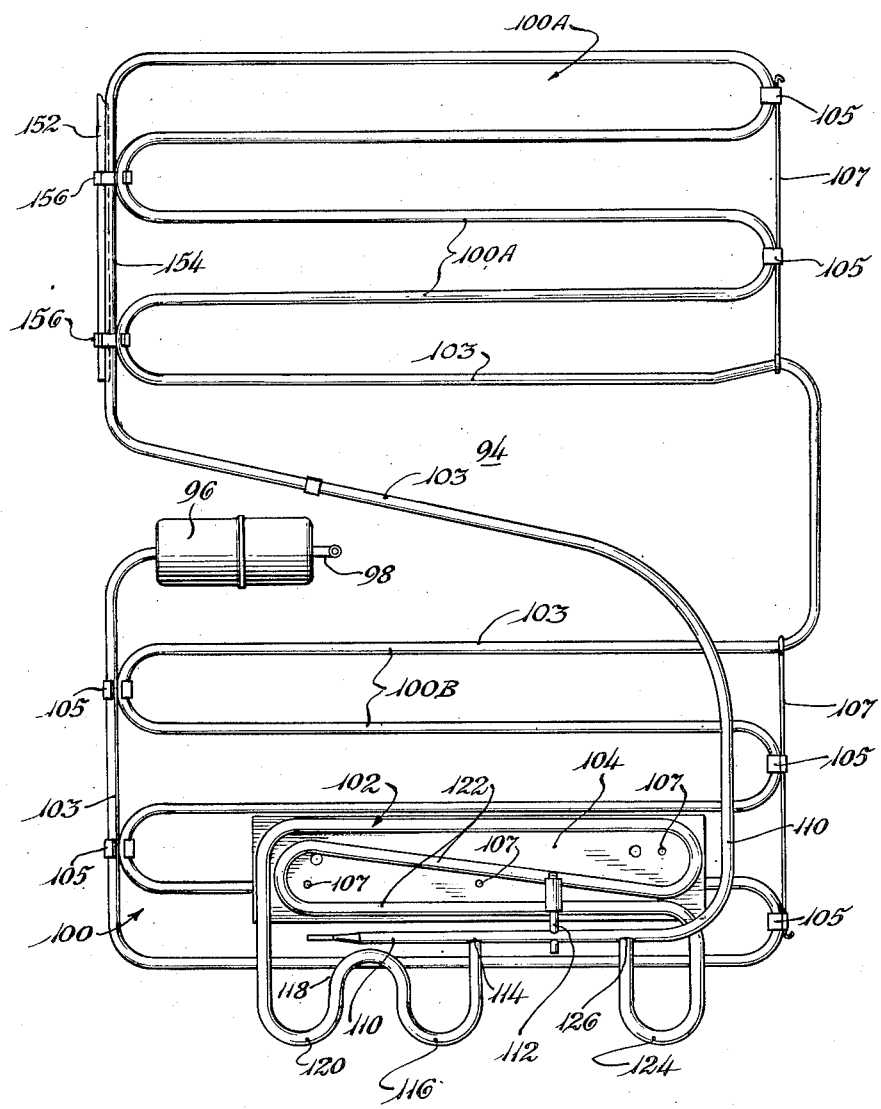

Feb. 26, 1952 E. T. MORTON 2,586,853
MULTIPLE TEMPERATURE REFRIGERATOR
Filed Jan. 3, 1947 8 Sheets-Sheet 7
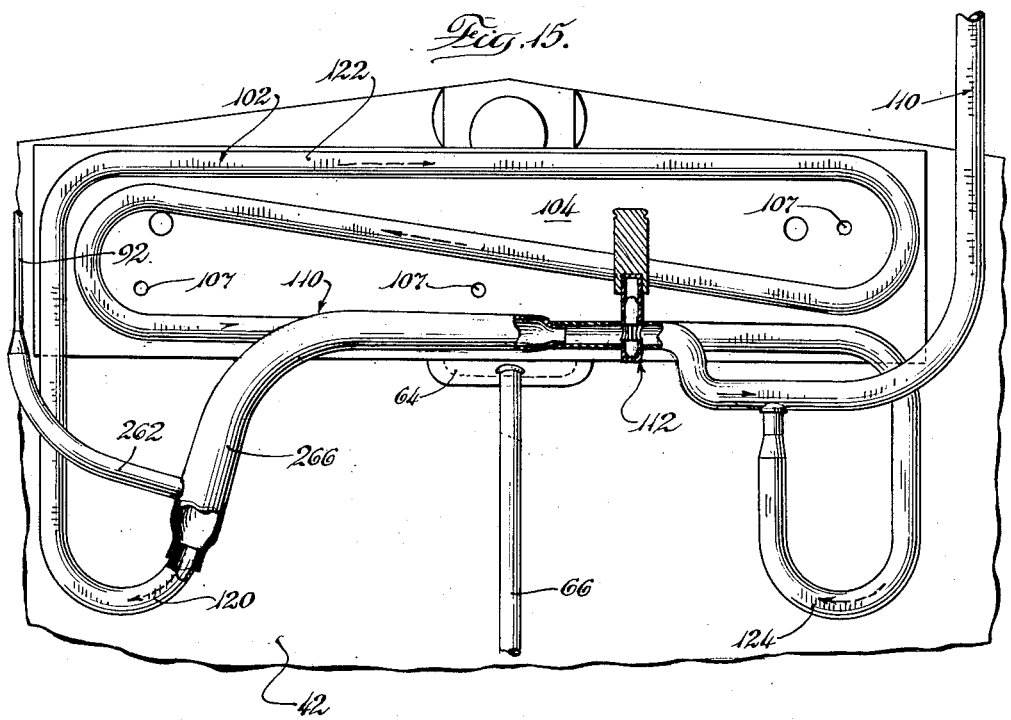
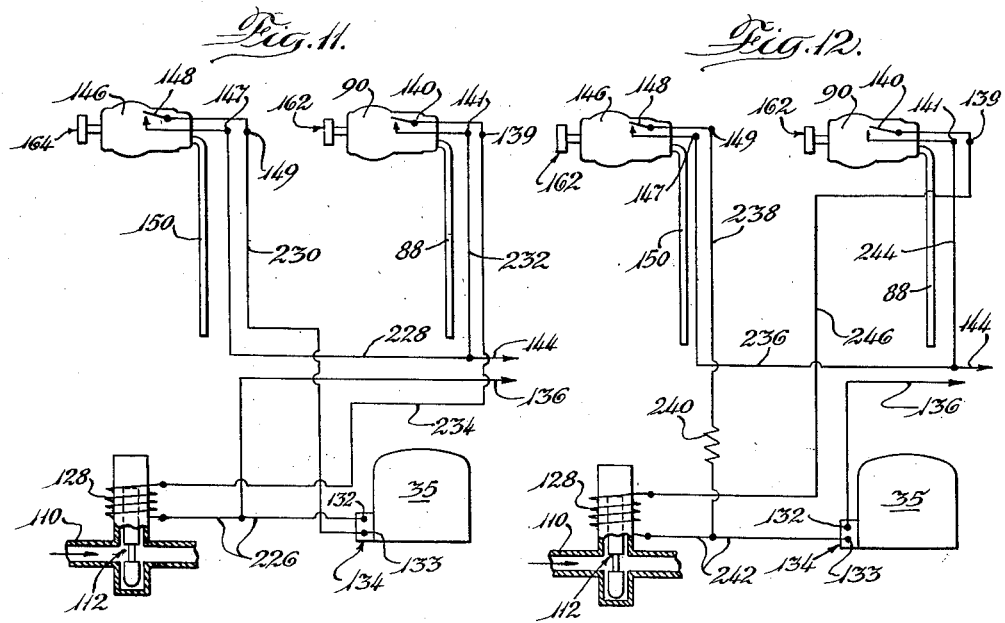
Inventor:
Evans T. Morton
By Hinkle, Horton, Ahlberg, Hansmann & Wupper
Attorneys.

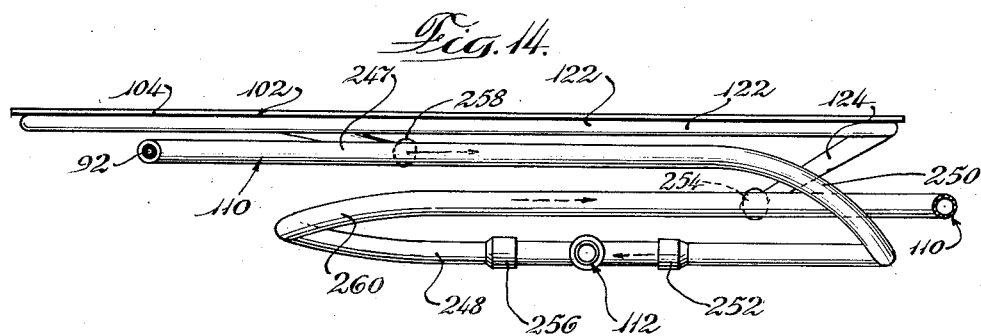
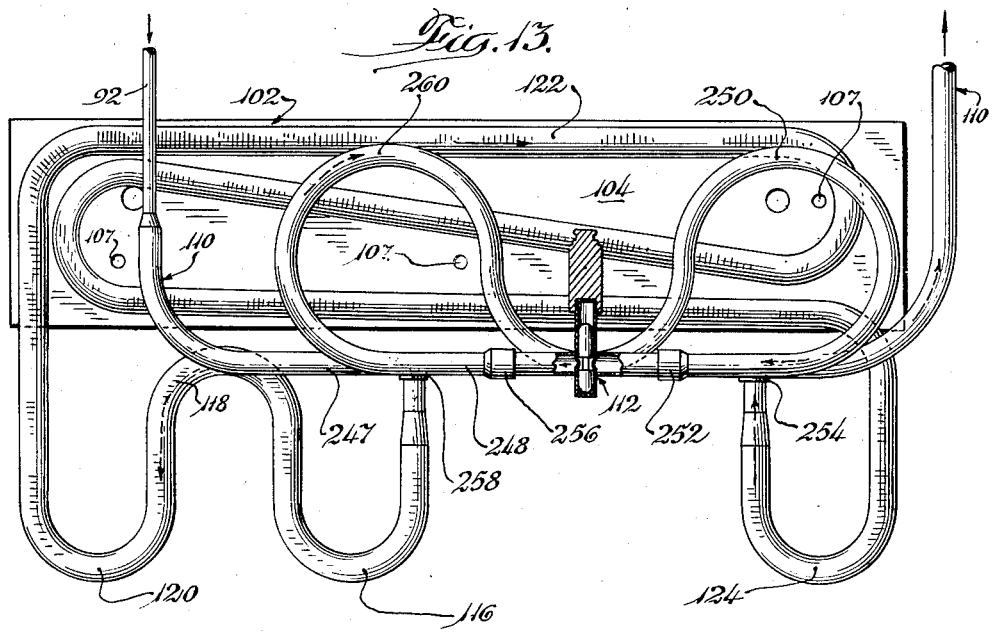

Patented Feb. 26, 1952

2,586,853

UNITED STATES PATENT OFFICE 2,586,853

MULTIPLE TEMPERATURE REFRIGERATOR

Evans T. Morton, Chicago, Ill., assignor to Admiral Corporation, Chicago, Ill., a corporation of Delaware Application January 3, 1947, Serial No. 720,080

22 Claims. (Cl. 62—4)

1

The present invention relates to refrigerators and in particular it relates to an improved multi-temperature refrigerator.

The principal object of this invention is to provide an improved refrigerator having at least one compartment which is maintained at a temperature considerably below the freezing point of water and at least one compartment which is maintained at a temperature only slightly above that freezing point with a moist atmosphere.

Another object is to provide a multi-temperature refrigerator which will maintain the desired temperature and humidity conditions under wide variations of load in either or both of its compartments and of outside or ambient temperatures.

A further object is to provide an improved multi-temperature refrigerator which is easy initially to assemble and subsequently to service. To this end a refrigerating system of the so-called "primary-secondary" type is employed, and the complex elements such as valves, compressor, motor and other moving parts are associated with the "primary" and are easily removable and replaceable into the refrigerator cabinet.

Another object is to provide an improved two-temperature refrigerator having a hermetically sealed system including compressor, condenser, valves, evaporators and connecting tubing.

A further object is to provide an improved refrigerator having a compartment to be maintained above freezing temperature and another compartment to be maintained at subfreezing temperatures wherein the temperatures of the two compartments may be independently controlled and adequate cooling of both compartments is insured regardless of their loads.

Still another object is to provide a novel multi-temperature refrigerator utilizing a "primary-secondary" type of refrigerant circulating system wherein separate controls are provided effecting circulation of refrigerant in the primary system and in the secondary system and wherein the operation of one control has no adverse effect upon the circulation of refrigerant through the circuit which effects operation of the other control.

Still another object is to provide a novel refrigerator utilizing a primary-secondary" type of refrigerant circulating system wherein the primary evaporator is divided into two sections, one of which may be by-passed, and incorporates means for minimizing parallel flow of liquid refrigerant.

Other objects and advantages will become apparent from the following description taken in

2 conjunction with the accompanying drawings wherein:

Fig. 3 is a cross-sectional view of the refrigerator shown in Figs. 1 and 2, on a slightly larger scale, illustrating the primary system removed from the refrigerator cabinet;

Fig. 4 is a rear elevational view of the food compartment liners showing the coils and connecting tubing but omitting the refrigerant condensing or liquifying unit and the insulation and other cabinet elements;

Fig. 5 is an elevational view of the secondary system tubing looking at the tubing from the side which lies against the food compartment liner and showing the tubing in flat condition before being bent for fastening to the food compartment liner;

Fig. 6 is an elevational view of the evaporator coils of the primary system showing the tubing in a flat condition before being bent for fastening to the colder compartment liner;

Fig. 7 is an enlarged cross-sectional view of the "down" tube in the secondary refrigerant circulating system and may be considered as being taken substantially on the line 7—7 of Fig. 5, looking in the direction of the arrows;

Fig. 8 is a cross-sectional view of the "down" tube of the secondary refrigerant circulating system taken on the line 8—8 of Fig. 7, looking in the direction of the arrows;

Fig. 9 is a detailed cross-sectional view of a greatly enlarged scale of the thermostat and adjustment control knobs and the mounting therefor, taken substantially on the line 9—9 of Fig. 1, looking in the direction of the arrows;

Fig. 10 is a diagram of a simplified electrical control circuit used in connection with the primary-secondary refrigerant circulating system of this invention;

Fig. 11 is a diagram of a modified electrical control circuit;

Fig. 12 is a diagram of a second modification of the electrical control circuit;

Fig. 13 is an enlarged elevational view of a portion of the primary evaporator showing a modified tubing arrangement which is effective to minimize "parallel flow" of liquid refrigerant;

Fig. 14 is a plan view of the tubing of Fig. 13; and

Fig. 15 is an elevational view similar to Fig. 13 of a further modification of primary evaporator tubing arrangement to minimize "parallel flow" of liquid refrigerant.

Figure 1:
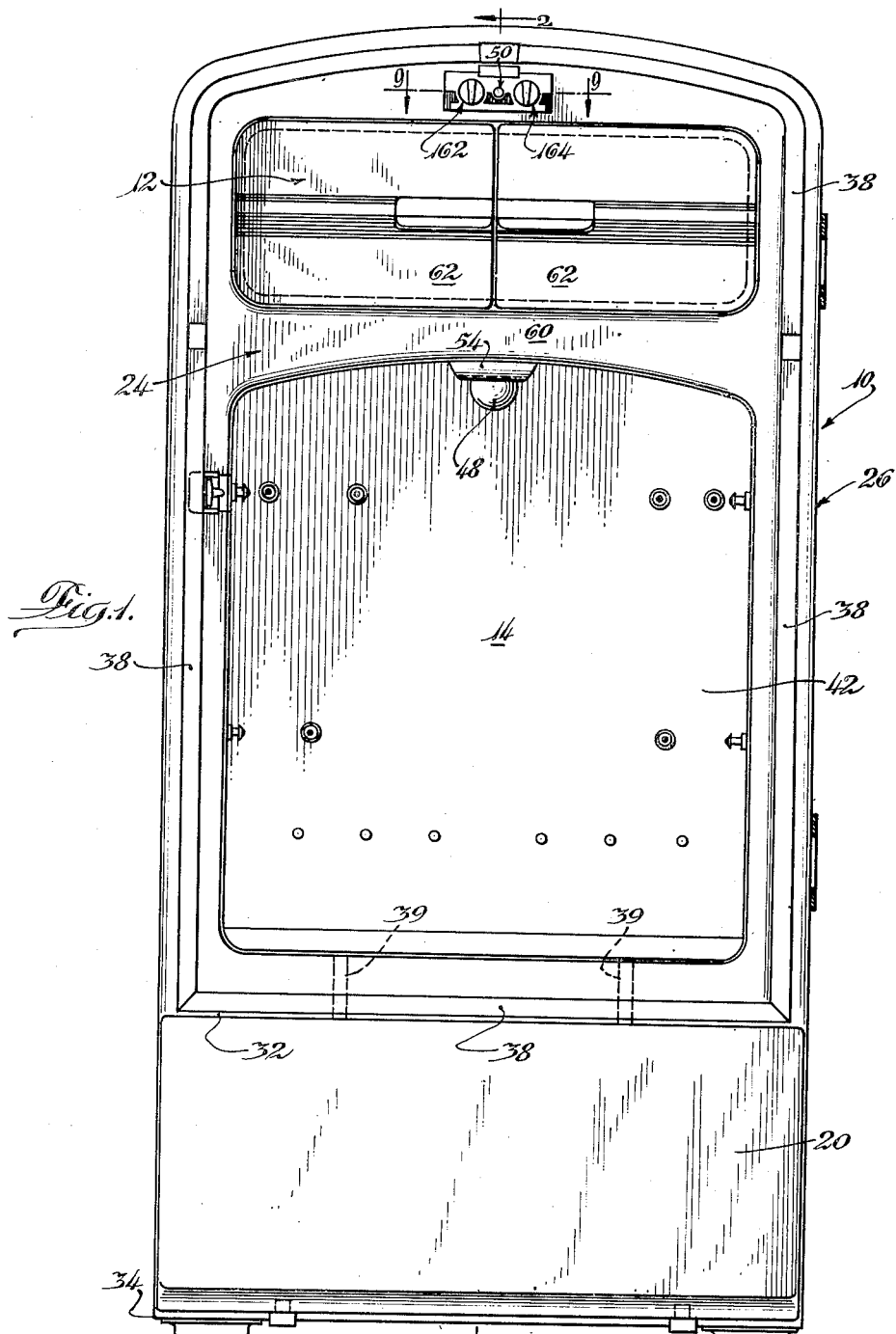
Fig. 1 is a front elevation view, with the main outer door removed, of a multi-temperature refrigerator.
Figure 2:
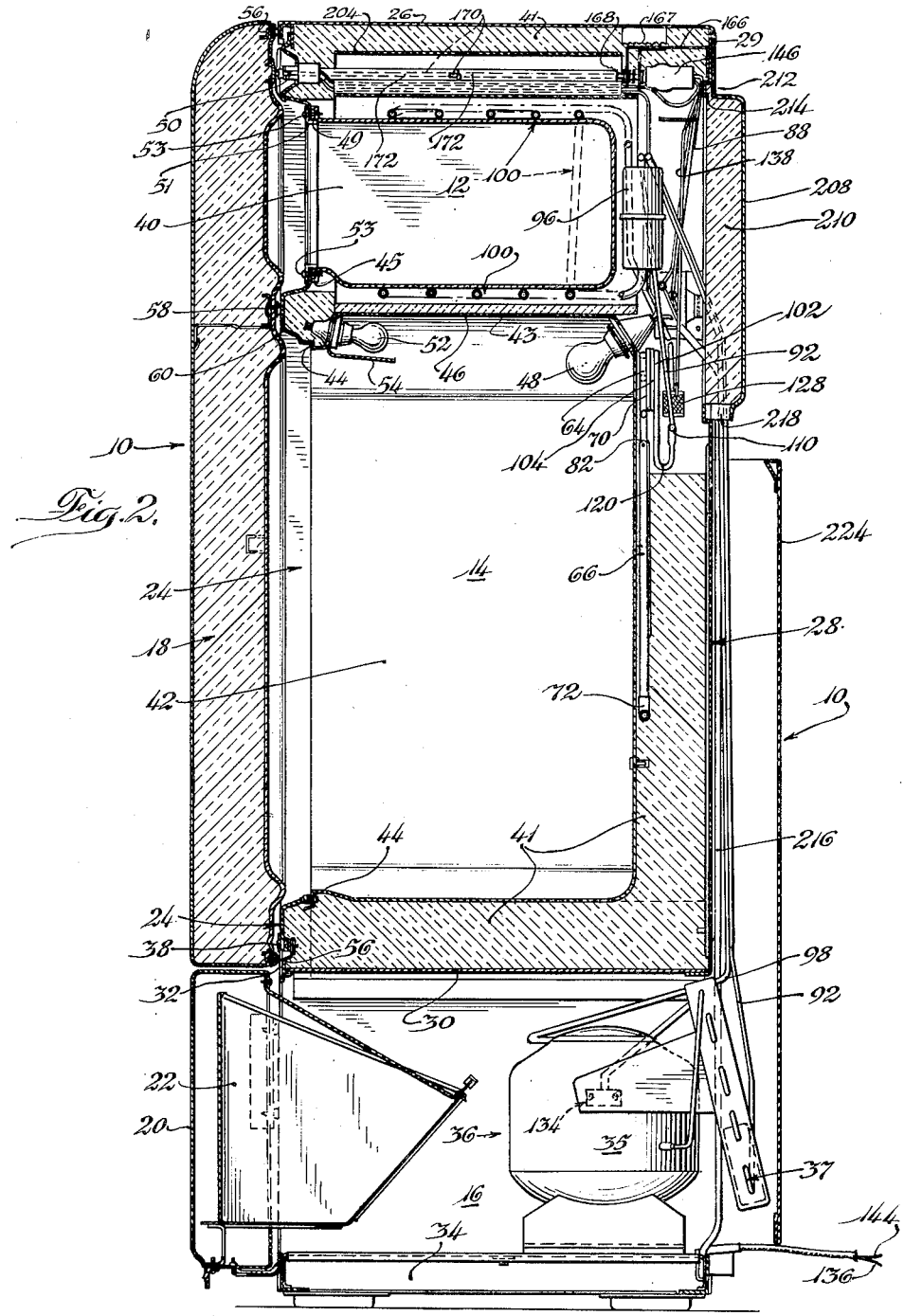
Fig. 2 is a cross-sectional view of the refrigerator shown in Fig. 1 and may be considered as being taken substantially on the lines 2—2 of Fig. 1, looking in the direction of the arrows.

Referring particularly to Figs. 1, 2 and 3, it will be seen that the refrigerator of the present invention comprises a cabinet 10 divided into three compartments—a freezing locker or "frost chest" 12, a food storage and "moist cold" compartment 14 and a machinery compartment 16. The freezing locker 12 and food storage compartment 14 are closed by an insulated door 18, and the machinery compartment 16 is closed by a separate door 20, hinged at the bottom, which has a vegetable bin 22 mounted on its inner side. The cabinet construction includes a molded plastic material doorway frame 24, an outer shell 26 secured along its front edge to the outer top and sides of the frame 24, a rear panel 28 which is secured to a flange 29 along the rear edge of the shell 26, and a bottom panel 30 which has its forward edge connected to the frame 24 by means of a rail 32 and its rear edge connected to the rear panel 28.

The cabinet is mounted on a base frame 34 which also provides the mounting for the refrigerant liquefying or condensing means or unit 36. The front of the cabinet is ornamentally finished by a number of sections of extruded aluminum trim 38 which close the gap between the doorway frame 24 and the outer shell 26 and rail 32. The construction of the refrigerator cabinet, and in particular the doorway frame 24 and its associated parts and the door 18, is more fully described in the copending application of Evans T. Morton, Serial No. 719,669, filed January 2, 1947, for an invention entitled "Refrigerator Cabinet Construction."

The space between the frame 24, the outer shell 26, the rear panel 28, the bottom panel 30, freezing locker liner 40 and food storage compartment liner 42, is filled with a suitable thermal insulating material 41, such as balsa wool, Aero Felt or rockwool. This insulation is blown into the space around the compartment liners except for the space between the freezing locker liner 40 and the moist cold compartment liner 42 which is filled by a pair of trapezoidal-shaped blocks or pads of insulation 43. A pair of blocks 39 of fibreboard is positioned between the bottom of the liner 42 and the top of the panel 30 as added support for this liner and to space the liner 42 from the bottom panel 30. Should this support prove insufficient, additional support may be obtained by a pair of corner braces (not shown) secured at their centers to the rear face of the liner 42 near the lower corners thereof and having their extremities secured to the rear of the cabinet at the junctures between the shell 26 and rear wall panel 28 and between the panel 28 and bottom panel 30.

The food storage compartment liner 42 is a deep metallic box having a front opening substantially coextensive with its face; it is formed with an outwardly-projecting peripheral flange 44 so that the liner may be suitably secured to the frame 24 at spaced intervals around the opening. The joint between the liner 42 and the frame 24, as well as all the other permanent cabinet joints, may be sealed with a bituminous cement such as Hydrolene or other suitable sealing compound. The insulated space in the cabinet is thus sealed against the infiltration of moisture carried thereinto by the ingress of atmospheric air.

The top of the liner 42 is crowned at 46 so that the moisture condensed upon the ceiling of the moist cold compartment 14 will flow to and down the side walls of the compartment to a suitable drip and condensate collector such as that described in the copending application of George R. Heidenblut, Serial No. 682,092, filed July 8, 1946, and which has now matured into Patent No. 2,484,997, granted October 18, 1949, for an invention entitled "Refrigerator."

The food storage compartment is provided with a suitable incandescent light bulb which is turned on by means of the switch 50 (Figs. 1 and 9) incident to the opening of the cabinet door 19 and with an ultraviolet sterilizing lamp 52 which burns while the refrigerant condensing or liquefying unit is operating. The lamp 52 is provided with a reflector shield 54 to shield the food stored on the shelves (not shown) within the compartment 14 from the direct rays from the lamp. The ultraviolet lamp 52 sterilizes the circulating air within the storage compartment 14 rather than acting directly upon the food stored within the compartment.

The door 18 has a peripheral sealing gasket 56 which abuts against the front face of the cabinet to seal the freezing locker 12 and the food storage compartment 14 from the atmosphere. A similar sealing gasket 58 extends transversely across the door 18 to abut against cross bar 60 of the frame 24 and seal the freezing locker 12 from the moist cold compartment 14 thereby assisting in the effective maintenance of the temperature differential between these two compartments. The freezing locker 12 may be provided with a suitable door or doors 62 (seen only in Fig. 1) further to separate the freezing locker from the atmosphere and from the compartment 14. The doors 62 do not seal against the frame 24 or liner 40, the opening around the doors preventing an accumulation of frost upon their edges which otherwise would freeze them shut.

The freezing locker liner 40 is provided with a forwardly facing flange 45 which is screwed to flange 47 defining the freezing locker access opening in the frame 24. A soft rubber-like gasket 49 is confined between the flanges 45 and 47 and the joint is covered by a sealing trim 51. A set of screws 53 secures the trim 51, flange 47, gasket 49 and liner flange 43 together thereby removably mounting the liner 40 in the cabinet.

Referring now particularly to Figs. 4 and 5, it will be seen that the secondary refrigerant circulating system comprises a tubing or coil which may be divided into three sections—namely, condenser 64, down tube 66 and evaporator coils 68. The condenser tubing 64 is brazed, soldered, or welded, or otherwise secured in good thermal contact to a contact plate 70 and has its outlet connected to the upper end of down tube 66. If preferred the condenser tubing and the contact plate can be made of complementary stampings which would provide a finned contact area and a passageway for the refrigerant.

The lower end of the down tube 66 is provided with a T-union or joint 72 which is connected to the lower end of the secondary evaporator coils 68. The coils 68 are shaped at their lower ends to provide, with the down tube 66 and the union 72, a well 74 for the entrapment of liquid refrigerant to assist in preventing reverse flow of gaseous refrigerant. Also the evaporator coils 68 are sloped so that gaseous refrigerant will circulate to the condenser, and the condenser coil is similarly sloped to direct liquid refrigerant into the down tube 66. Further to prevent reverse flow the down tube 66 is interiorly fitted with a plate or strip 76 (Figs. 7 and 8) having regularly spaced perforations extending its entire length. The strip 76 is substantially coextensive with the length of the down tube 66 and has a close sliding fit therewith. The tube 66 and perforated plate 76 break up any bubbles of gaseous refrigerant which otherwise would tend to cause reverse flow in the secondary system.

When the secondary system is mounted on the liner 42 the secondary evaporator coils 68 are firmly held against the outer face of the wall of the liner 42 by suitable fastening means 80. A suitable fastening means is more fully described in the copending application of Charles F. Patterson, Serial No. 682,082, filed July 8, 1946, and which has now matured into Patent No. 2,517,411, granted Aug. 1, 1950, for an invention entitled "Fastener." Fig. 4 shows the secondary evaporator coils 68 to extend over a substantially large portion of the food compartment liner 42 and to be spaced and arranged so as to provide the optimum heat transfer between the secondary system and the liner 42 consistent with good manufacturing processes. Once the evaporator coils 68 have been mechanically secured to the outer face of the liner wall, a heat transfer agent such as is filled in between the tubing and liner and around the tubing to increase the effective heat transfer. Such a transfer agent has high thermal conductivity and may be a soft non-oxidizing material impregnated with aluminum flakes, graphite and the like. The drawings show that the down tube 66 is spaced from the liner 42. While this is not absolutely essential, no attempt is made to effect heat transfer between the down tube 66 and the compartment liner 42.

The secondary evaporator system is charged with a liquid refrigerant through a charging tube 82 which is connected to the upper end of the down tube 66. When the proper amount of refrigerant has been placed in the coils of the secondary system the charging tube 82 is pinched and sealed at 84. After the coils of the secondary system have been charged with refrigerant and have been mounted upon the liner 42 and thermally secured thereagainst, the secondary system should require no further servicing and with the liner 42 may be permanently installed in the refrigerator cabinet.

A tubular well 86 partially closed at one extremity is welded or brazed to the down tube 66 to receive and encase feeler bulb 88 of thermostatic control 90 for the moist cold compartment. The feeler bulb 88 is merely pushed into the well 86 until it contacts the bottom thereof and since the tube 86 is readily deformed it may be made to contact the wall of the well 86 giving adequate transmission of temperature conditions between the secondary system and the compartment 14 and the control 90. The secondary refrigerant circulating system may be controlled from any point which will reflect the temperature conditions within the compartment 14, and the location of the well 86 on the down tube 66 was selected for convenience as will hereinafter be pointed out.

The primary system is clearly shown in Figs. 2, 3, 4 and 6 and includes a refrigerant liquefying or condensing means or unit 36 consisting of a combination motor compressor unit 35 and a cooling condenser 37; the system also includes capillary tube 92, primary evaporator 94, accumulator 96, and a suction tube 98 leading back to the condensing unit 36. All of the aforementioned elements of the primary system are connected in series, are hermetically sealed and are removable as a unit from the refrigerator cabinet as shown by Fig. 3. The capillary tube 92 preferably is soldered or brazed to the suction tube 98 for the absorption of heat from the cold refrigerant gas flowing through the suction tube 98. While a mechanical primary system has been shown in describing the present invention, any other suitable liquefying or condensing means may be employed.

The evaporator 94 is divided into two sections; one section 100 comprises a tortuous section of tubing firmly secured to the freezing locker liner 40 by suitable fasteners 101—similar to the fasteners 80 used to secure the secondary evaporator to the liner 42. The other portion 102 is brazed, soldered, welded or otherwise secured in good thermal contact to a second contact plate 104 which is secured in face to face heat exchange relationship to the secondary system contact plate 70 by means of suitable bolts 106 provided with nuts 108; the heads of the bolts 106 are welded to the contact plate 70 and extend through suitable openings 107 in the contact plate 104. In order to obtain a maximum heat transfer between the contact plates, they are coated with a layer of a heat transfer agent such as that used in conjunction with the evaporator coils 68.

The capillary tube 92 is connected to tube 110 forming the inlet end of the evaporator 94 of the primary system. The tube 110 is provided with a solenoid-operated flow-resisting valve 112 which is more fully described in the copending application of Evans T. Morton and George R. Heidenblut, Serial No. 719,670, filed January 2, 1947, for an invention entitled "Restricting Valve." The purpose of this valve will be explained more fully hereinafter but in general its function is to increase the resistance to flow of refrigerant through the tube 110 to such an extent that the refrigerant will be diverted through the evaporator coil 102.

The inlet end of the evaporator coil 102 is connected to the tube 110 at 114, which is a point ahead of the valve 112, and the first portion of the coil 102 comprises three semi-circular portions 116, 118 and 120 connected in series. The last semi-circular portion 120 is connected to tubing 122 which is welded, brazed or otherwise secured in good thermal contact to the face of the contact plate 104. The tubing 122 is flattened somewhat (see Fig. 14) to increase the area of contact between the tubing and the plate 104 to an amount greater than if the tubing were left in its cylindrical shape, thereby to increase the heat transfer efficiency between the primary evaporator 102 and the secondary condenser 64. At its outlet end the evaporator coil 102 is provided with another semi-circular portion 124 which terminates in a junction at 126 with the tube 110.

The evaporator coil 102 is thus secured in the primary system in parallel with the valve 112. When the temperature in the moist cold compartment 14 is higher than that for which the thermostat control 90 has been set, the solenoid valve 112 will be positioned or closed so as to increase the resistance to flow of refrigerant through the tube 110. When, therefore, the liquefying or condensing unit 36 commences to circulate refrigerant through the primary system, the resistance presented by the valve 112 will be greater than that presented by the evaporator coil 102 including the traps 116, 120 and 124 formed by the previously described semi-circular portions of tubing. Consequently, the refrigerant will flow through the evaporator coil 102 and will cool the secondary condenser 64 causing refrigerant to circulate in the secondary system for the purpose of cooling the compartment 14. This condition will exist until one of two things happens; either the valve 112 shifts to open position as it will do when the temperature in the compartment 14 has been lowered sufficiently, or the primary condensing unit 36 stops operating as will be explained hereinafter. As long, however, as the valve 112 remains closed, the resistance to the flow of the refrigerant through the tube 110 will be such that cooling of the secondary condenser will take place during the periods that the unit 36 is operating.

When the compartment 14 has been cooled sufficiently, thermostatic control 90 will permit valve 112 to open and the liquid refrigerant which at that time is in the coil 102 will settle by gravity to the traps 116, 120 and 124. The liquid refrigerant contained in these traps and the normal resistance to flow presented by the tubing 122 will be such that during the time the valve 112 is open the refrigerant will flow through the tube 110 and to the evaporator coil 100 by-passing the coil 102.

The primary evaporator 94 is illustrated in Fig. 6 in the flattened condition that it has before it is fastened to the liner 40. Coils 100A are fastened to the top of the liner and are secured by the fasteners 101, and the coils 100B are secured to the lower face of the liner 40 by other fasteners 101 (Fig. 4). In order that this be done the evaporator tubing is rotated or twisted through the four lengths of tubing indicated by the reference characters 103. The coils are tied together at the ends of the loops by suitable clips 105 and tie rods 107. After the evaporator coil 100 has been secured to the liner 40 fillets of a thermally conductive material may be placed between the tubing and the liner 40 and around the tubing to increase the heat transfer between the evaporator 100 and the liner 40; if preferred, the whole may then be covered with Hydrolene.

A preferred electrical circuit will now be described with particular reference to Fig. 10. As described in the aforementioned copending application of Evans T. Morton and George R. Heidenblut, Serial No. 719,670, a solenoid coil 128 is mounted over the valve 112 (Fig. 2). The coil 128 has one end connected to a conductor 130 which is connected to one terminal 132 of a junction box 134 removably plugged to the motor compressor unit 35. The terminal 132 is in turn connected to one side 136 of the 110-120 volt line or other suitable source of electric power. The other end of the solenoid coil 128 is connected by a conductor 138 to the terminal 139 of switch 140 which is a component of the moist cold compartment thermostatic control 90. A second thermostatic control 146, including a switch 148 and a gas feeler bulb 150 is provided for the freezing locker. One terminal 147 of the switch 148 is connected to a terminal 141 of the switch 140 by a conductor 142 so that the switches 140 and 148 are connected in series. The second terminal 149 of the switch 148 is connected to the second side 144 of the 110-120 volt line. The terminal 147 is connected by a conductor 160 to a second terminal 133 of the junction box 134.

A well 152 (Figs. 3, 4 and 6) similar to the well 86 is maintained in heat transfer relationship with the primary evaporator coil 100 and therefore the frost chest liner 40 at 154 by means of retaining clips 156. The well 152 is open at one end for the insertion of the bulb 150 and is partially closed at the other end; the bulb 150 being similar to the bulb 88 is readily deformable and contacts the wall of the well 152 to transmit the temperature conditions in the primary evaporator 100 and freezing locker 12 to the thermostatic control 146.

When both of the switches 140 and 146 are open, the circuit is deenergized, the valve 112 is open, and the refrigerant condensing or liquefying unit 36 is inactive so that there is no forced cycling or flow of refrigerant through the primary system. It may be desired to maintain the temperature in the freezing locker 12 within the range of 5° F. to 8° F. and that in the food storage compartment within the range of 38° F. and 40° F. (These temperature ranges are merely illustrative and are in no way limitative, as any reasonable range of temperatures may be obtained for the two compartments.)

Should, for example, the temperature in the freezing locker rise above 8° F. through an increase in its contents, or loss of cold air, the changed temperature conditions will be transmitted through the walls of the liner 40 and the bulb 150 to the thermostatic control 146. The control 146 will operate to close the switch 148 energizing the circuit to the motor compressor unit 35; this circuit is as follows: line 144, terminal 149, switch 148, terminal 147, conductor 160, terminal 133, motor compressor unit 35, terminal 132, and line 136. As the valve 112 is open (in this example) refrigerant will circulate from the condensing unit 36 through the capillary tube 92, tube 110 and evaporator 100 in contact with the frost chest liner 40. When the temperature in the freezing locker 12 has been lowered sufficiently, the control 146 will operate to open the switch 148 deenergizing the circuit to the motor compressor unit 35.

Should, however, the temperature at this time in the moist-cold compartment 14 be above the predetermined value, for instance 40° F., the thermostatic control 90 will have operated to close the switch 140. If, when this occurs, the switch 148 is open, no cooling of the secondary condenser will take place because the switches 140 and 148 are connected in series and the condensing unit will not be operating. When the switch 148 is closed by action of the control 146 and the condensing unit 36 is closed to operate again, the solenoid coil 128 is energized to close the valve 112 and increase the resistance to flow in the tube 110. This circuit is as follows: line 144, terminal 149, switch 1148, terminal 147, conductor 142, terminal 141, switch 140, terminal 139, conductor 138, solenoid coil 128, conductor 130, terminal 132, and line 136. As soon as the valve closes, the resistance in the tube 110 is increased as previously described and the refrigerant will flow through the evaporator coil 102 in contact with the contact plate 104 before it flows through the evaporator coil 100.

Heat is transferred between the primary evaporator 102 and the secondary condenser 64 by means of the thermal communication afforded by the contact plates 104 and 70. These contact plates act as radiating fins for the evaporator coil 102 and the condenser coil 64 to provide an excellent heat transfer. Loss of cold is limited because the contact plates 70 and 104 are surrounded by blankets of heat insulating material which have been omitted from the illustration in Fig. 2 so that the parts of the refrigerator and their relation might be seen more clearly. As the well 156 is placed on that portion of the evaporator coil 100 which is closely adjacent the outlet of the evaporator 102, the temperature of the refrigerant at that point will be indicative of whether or not the primary system is being used to cool the secondary condenser. When the evaporator 102 is cooling the condenser 64, the load on the primary system is sufficiently great to prevent the thermostatic control from immediately shutting off the condensing unit 36. Since the primary system has been started in response to the temperature of the refrigerant in the evaporator coil 100 it will continue after the secondary system has been satisfied until the freezing locker has been sufficiently lowered.

The above description of operation does not mean that once the liquefying or condensing unit has been started with both the moist cold compartment 14 and the freezing locker 12 at temperatures above their optimum maximum temperatures, that the primary system will circulate refrigerant through the evaporators 102 and 100 continuously until the temperatures of the two compartments have been reduced to within the desired ranges. When the refrigerator operates with the temperatures in both of the compartments above the desired ranges, the controls will operate in the aforementioned manner so that the moist cold compartment is cooled first. Since, however, the thermostatic bulbs are placed in positions outside of the compartments themselves, that is, on the outer walls or adjacent the outer walls of the compartments, they reflect the temperatures of the circulating refrigerant as well as the temperature within the compartments. The system will cycle on and off until the temperature in the moist cold compartment and the temperature in the freezing locker are both reduced to within the range desired. Tests have shown that a certain amount of leakage of cold to or absorption of heat from the freezing locker will take place through the insulation 43 which is placed between the liner 40 and the liner 42. While initially cooling the refrigerator, after a defrosting operation or when first installed, the moist cold compartment 14 will be cooled to within the desired range, the freezing locker 12 will be cooled slightly, and then the freezing locker will have its temperature reduced to within its optimum range.

The thermostatic controls 90 and 146 are provided with suitable manual adjustments 162 and 164, respectively. The control knobs for these adjustments are positioned at the front of the refrigerator cabinet above the freezing locker 12 (Figs. 1 and 4). Only one of them need be described in detail as they are identical in construction except for the respective temperature settings. Each of the thermostatic controls 90 and 146 is mounted at the rear of the refrigerator cabinet in the upper portion thereof, as clearly seen in Fig. 2, and is supported by means of a generally U-shaped bracket 166 which is provided with a bearing 168 to support the rear of a control rod 170 which extends from the thermostatic control 90 or 146 to the front of the cabinet. The bracket 166 is welded or otherwise suitably secured to the rear panel 28 of the cabinet, and is spaced from the shell 26 by a block 167 which is secured to the shell and to the bracket 160 by a suitable adhesive such as a low melting point odorless tar plus a wax and a petroleum jelly.

The bearing 168 is permanently affixed to the rear end of the rod 170 and rotates in the bracket 166. The bearing 168 is secured in an airtight manner to the inner or rear end of a twistable tube 172 which encases the rod 170 from the rear of the cabinet to the front. The twistable tube is secured to a sleeve 174 of rubber-like material which seals the tube against the frame 24 on either side of an opening 176. The rod 170 projects through and is rotatable in the sleeve 174 and its outer end 178 is splined to receive a suitable control knob 180 which is removably secured on the outer end of the rod 170 by a split ring 182.

The frame 24 is depressed at 184 around the openings 176 and opening 186 through which the switch 50 projects. The switch 50 is provided with a supporting mounting 188 which is secured to the frame 24 by bolts 190 which also fastens a bracket 192 in the recess 184. An escutcheon plate 194 is mounted on the bracket 192 by means of suitable screws 196. The escutcheon plate has recesses 198 for the control knobs 180 and an opening 200 for the button 202 of the switch 50. The escutcheon plate may carry suitable indices for indicating proper settings of the thermostatic controls 90 and 146. The inner side of the frame 24 adjacent the openings 176 and 186 is given a liberal coating of a suitable sealing compound so as to seal the interior of the cabinet at this point against the ingress of atmospheric air. A shield 204 is provided for the purpose of keeping the insulation free from around the twistable tubes 172 and from interfering with the easy and free operation of the thermostatic controls. The shield 204 also encloses the insulated electrical conductors for the circuit of the incandescent light 48 and switch 50.

Referring to Figs. 2 and 3, it will be seen that the primary evaporator and liner 40 are removable from the refrigerator cabinet through an opening 206 in the rear panel 28. The opening 206 is closed by a pan-shaped panel 208 filled with insulation 210. The panel 208 is secured to the back wall panel 28 by screws 212 and the cabinet is sealed at this point against leakage of atmospheric air thereinto by a suitable sealing gasket 214 held between the panel 208 and the rear wall panel 28. The capillary tube 92, the suction line 98 and an electrical conduit 216 enter the insulated portion of the cabinet at the bottom of the panel 204 through a sealing grommet 218. The electrical conduit 216 is connected to a terminal board 220 on a transformer 222. The transformer 222 is of the step-down type and is customarily incorporated in a refrigerator utilizing an ultra-violet lamp such as the lamp 52 for sterilizing purposes. The refrigerator is completed by a removable stack 224 mounted on the rear of the compartment to envelop the condenser 37, the capillary tube 92 and the suction tube 98 for the purpose of creating a draft of air for cooling the coils of the condenser 37.

The primary refrigerant circulating system is removable from the refrigerator so that it might be replaced or repaired at the shop or plant of the manufacturer to minimize the dangers involved in repairing the refrigerant circulating system in the home of the user. Since the primary system can be removed and immediately replaced with another and similar primary system, the user of the refrigerator is not inconvenienced by having his refrigerator out of use for a length of time any greater than that required to remove one system and replace it with another. The primary refrigerant circulating system is removed by removing the panel 208 and the blankets of insulation which cover the contact plates 70 and 104 and rear portion of the freezing locker liner 40 and the connecting tubing. The gas tube 150 is removed from the well 152 on the evaporator coil 100, and if the gas tube 88, which is inserted into the well 86, interferes with the clear passage of the primary system, it may be removed from the well 86 and bent out of the way. The convenient transposition of the well 86 makes this operation easy. The screws 53 fastening the liner 40 to the frame 24 are removed, and the nuts 108 are unscrewed from the bolts 106 so that the contact plates 70 and 104 may be separated. The stack 224 is removed from the back of the cabinet, and the bolts fastening the condensing unit 36 to the base frame are removed. All of the mountings for the primary system are thus disconnected, and the system may be slid out of the back of the refrigerator cabinet. The reverse operations are followed when placing the primary system in the cabinet.

The control circuit of Fig. 10 illustrates an arrangement whereby the energization of the solenoid 128 is dependent upon whether or not the motor compressor unit 35 is operating. In the circuit of Fig. 11 the energization of the solenoid 128 is independent of whether or not the motor compressor unit is operating, as the switches 140 and 148 of the thermostatic controls 90 and 146, respectively, are not connected in series. In this modified control circuit the line 136 is connected to a conductor 226 which has one end connected to the solenoid 128 and the other end connected to terminal 132 of the junction box 134 for the motor compressor unit 35. The other side 144 of the 110-120 volt line is connected by a conductor 228 to terminal 147 of the switch 148. The terminal 149 of this switch is connected by means of conductor 230 to the terminal 133 of the junction box 134. Line 144 is also connected by means of the conductor 232 to terminal 141 of the switch 140, while terminal 139 of this switch is conducted by a conductor 234 to the other side of the solenoid 128.

With a refrigerator equipped with a control such as that shown in Fig. 11 the rise in temperature in the moist cold compartment 14 will cause the switch 140 to close which energizes the solenoid coil 128 closing the valve 112. This circuit is as follows: line 136, conductor 226, solenoid 128, conductor 234, terminal 139, switch 140, terminal 141, conductor 232, and line 144. This circuit, however, does not cause the motor compressor unit 35 to commence operation because the switch 148 is still open. When switch 148 is closed by the thermostatic control 146, the motor compressor unit 35 is energized, and this circuit is as follows: line 136, conductor 226, terminal 132, motor compressor unit 35, terminal 133, conductor 230, terminal 149, switch 148, terminal 147, conductor 228 and line 144. This circuit differs from that of Fig. 10 only in that the closing of the switch 140 conditions the primary refrigerant circulating system and particularly the primary evaporator coil for operation to cool the secondary condenser prior to starting the motor compressor unit 35. In other respects this circuit operates in the same manner as does the circuit of Fig. 10.

The circuit of Fig. 12 differs materially from either of those in Fig. 10 and Fig. 11 and provides for parallel operation of the refrigerant liquefying unit. In this circuit the line 136 is connected directly to the unit 35. The line 144 is connected by a conductor 236 to terminal 147 of the switch 148. The terminal 149 is connected to a conductor 238 which includes an electrical resistor 240 and is connected to a conductor 242 which has one end connected to the terminal 133 of the junction box 134 and the other end connected to one end of the solenoid coil. The resistor 240 which is in a circuit parallel to the coil 128 has a value to match the impedance of the coil 128 and balances the parallel circuits so that should both the switches 140 and 148 be closed the coil 128 will not be short circuited. The line 144 is also connected by means of a conductor 244 to terminal 141 of the switch 140. The terminal 139 of this switch is connected by a conductor 246 to the other side of the solenoid coil 128.

In a refrigerator equipped with the control circuit of Fig. 12, should the moist cold compartment 14 become warmer than desired, the thermostatic control 90 will close the switch 140, thereby energizing the solenoid 128 to close the valve 112 and also energizing the circuit to the motor compressor unit 35. This circuit is as follows: line 136, terminal 132, motor compressor unit 35, terminal 133, conductor 242, solenoid 128, conductor 246, terminal 139, switch 140, terminal 141, conductor 244, and line 144. Thus both the solenoid coil 128 and the motor compressor unit are actuated and refrigeration of the moist cold compartment 14 takes place independently of the requirements of the frost chest. The circuit for energizing the condensing unit to cool the freezing locker 12 is as follows: line 136, terminal 132, motor compressor unit 35, terminal 133, conductor 244, resistor 240, conductor 238, conductor 149, switch 148, terminal 141, conductor 236, and line 144.

Figs. 13 to 15 illustrate two modifications of the primary evaporator construction which minimize parallel flow of liquid refrigerant through the tube 110 and evaporator 102 when the valve 112 is closed. Referring first to Figs. 13 and 14 it will be seen that the tube 110 is formed of two parts or sections 247 and 248. The tube 247 is connected to the capillary tube 92 and formed with a loop 250; the tube 247 is connected at its opposite end to the valve 112 by means of a bell joint 252 and to the evaporator tubing 122 at 258. The tube 248 is connected to the outlet side of valve 112 with a bell joint 256 and is also connected to the outlet side of the evaporator 102 at 254. The connections 252, 254, 256 and 258 are brazed, soldered or otherwise made pressure tight against the leakage of refrigerant. The tube 248 has a loop 260 formed in it so as to connect to the evaporator 100 which cools the freezing locker 12.

The refrigerant flows from the capillary tube 92 into the tube 247 which carries it behind the valve 112 and through the loop 250 which is connected to the coil 102 and valve 112. If the valve 112 is closed then the liquid refrigerant flows through the traps 116 and 120, tubing 122, and trap 124 to the tube 248. If the valve 112 is open then the refrigerant by-passes the evaporator 102 as heretofore explained and flows directly to the evaporator 100.

When the liquid refrigerant flows from the capillary tube 92 into the larger tube 110 it undergoes a reduction in pressure which permits a partial vaporization. The valve 112 is not liquid or gastight so that it may work freely and without possibly sticking in either open or closed position. When the valve 112 is closed there is a very slight clearance between the valve member and housing so that gas may pass therethrough somewhat freely. However, this clearance is so slight that it does provide substantial resistance to the flow of liquid refrigerant and this resistance is greater than the total resistance of the evaporator 102, and the flow of refrigerant is through the evaporator 102. The refrigerant flowing through the tube 110 is principally liquid but does contain vapor bubbles. These vapor bubbles tend to carry "slugs" of liquid refrigerant through the valve 112. This would not be a serious objection were it not for the fact that these "slugs" of liquid refrigerant unduly cool the evaporator coils adjacent the feeler bulb 150 of the thermostatic control 146 to cause the condensing unit 36 to shut off too early in the cycling.

The tubing 247 from the connection 258 to the top of the loop 250 has been found to separate the liquid refrigerant from the gas, the liquid refrigerant remaining on the bottom of the tubing and flowing into the coil 102 at the connection 258. The bubbles of vaporized refrigerant tend to break up and move along the top of the tubing to flow directly to and through the valve 112. It has been found that the minimum inside diameter of the loop tubing may have is one quarter inch. This separation of gaseous refrigerant from liquid refrigerant increases the efficiency of the primary system and permits a greater accuracy in timing the "cycling on and off" of the primary system when it is cooling the secondary.

A secondary arrangement of primary evaporator tubing which will perform the same function is illustrated in Fig. 15. In this modification the capillary tube 92 is connected to a short or interconnecting section of tubing 262 which has a larger diameter than the capillary tube 92 but not as large a diameter as the tube 110 or the evaporator tubing. The interconnecting tubing 262 is in turn connected at 264 to the evaporator coil 102 and tube 110. At the connection 264 and leading to the valve 112 the tubing 110 has a large diameter section 266. As an example if the evaporator tubing has a ⅜ inch diameter, the diameter of the section 266 may be ⅝ inch. The large diameter section 266 provides a separator wherein the lighter gaseous refrigerant can rise to the top portion of the tube and pass on to and through the closed restricting valve 112. The liquid refrigerant substantially free of vapor bubbles flows back through the evaporator coil 102. The function of this arrangement is substantially the same as that shown in Figs. 13 and 14 and the application need not be repeated.

It is also to be noted that the valve 112 in this modification is higher than its connections to the evaporator coil 102. This arrangement has been found to prevent frosting of the valve when closed. The same result is obtained by the double loops in the modification of Figs. 13 and 14.

The assembly of the refrigerator of the present invention is relatively simple. The food compartment liner 42 forms a subassembly and has the secondary evaporator and condenser coils mounted on it before it is mounted on the frame 24. The cabinet shell consisting of the outer shell 26, rear wall panel 28, bottom panel 30 and rail 38, and base frame 34 is laid on its back. The control rods 170 and controls 90 and 146 are mounted in the upper portion of the cabinet. Forms defining the space occupied by the liners 40 and 42 are placed in the cabinet shell and insulation is blown into the space between the form and the shell. After the insulation has been placed the frame 24 and liner 42 are mounted in the cabinet shell from the front and the frame is secured to the outer shell 26 and rail 38 and the joints are sealed.

The primary system is another subassembly and is inserted into the cabinet by mounting the motor compressor unit on the base 34 and the liner 42 in the upper portion of the cabinet. The controls are connected and electrical connections completed. The space behind the freezing locker liner 40 is packed with insulation, and the panel 208 is screwed to the rear wall panel 28 to close the opening 206. The stack 224 is placed around the condenser and tubing and secured to the cabinet. After the doors 18, 62 and 20 are mounted on the cabinet, the refrigerator is ready for operation. When completed the insulated space is sealed to the extent of withstanding a pressure of two inches of water, enough to prevent leakage therein.

From the foregoing description it will be seen that the multi-temperature refrigerator of this invention readily attains the stated objects. It will be apparent, however, that numerous changes and modifications may be made without departing from the spirit and scope of the present invention as defined by the appended claims.

What is claimed as new and desired to be secured by United States Letters Patent it:

1. In a multi-temperature refrigeration system of the primary-secondary type having a primary circuit and a secondary circuit including a condenser portion and an evaporator portion, the combination of a refrigerant conducting means in the primary circuit in heat exchange relation with the condenser portion of the secondary circuit, a by-pass in the primary circuit around said means, and means responsive to the temperature in the secondary circuit for controlling the flow of refrigerant through said means or said by-pass whereby a substantially uniform temperature may be maintained in the secondary system.

2. In a two temperature refrigerator having a primary circuit for cooling the colder compartment and a secondary system in heat exchange relation with the warmer compartment, the secondary system including a condenser portion and an evaporator portion, the combination of means placing a portion of the primary evaporator in heat exchange relation with the secondary condenser, means by-passing said portion of the primary evaporator, and means responsive to the temperature of the warmer compartment to direct the flow of refrigerant through the by-pass means or through said portion of the primary evaporator in heat exchange relation with the secondary condenser.

3. A multi-temperature refrigeration system comprising in combination a primary system including a condensing unit and an evaporator, said evaporator being divided into two portions connected in series, a secondary system including an evaporator and a condenser, said secondary condenser being arranged in heat exchange relation with one of said primary evaporator portions, means by-passing said last mentioned primary evaporator portion, and flow restricting means in said by-pass means controlled by the temperature in the secondary system for controlling the heat transfer between the primary evaporator and the secondary condenser.

4. In a refrigeration system of the primary-secondary type, a primary refrigerant circulating system including in combination a condensing unit and an evaporator, said evaporator comprising a pair of evaporator coils connected in series, means by-passing one of said evaporator coils, a controllable restriction in said by-pass means, means associated with said by-passed coil to prevent flow of refrigerant therethrough when the restriction in said by-pass is reduced to a minimum, and a secondary refrigerant circulating system cooled by said by-passed evaporator coil.

5. A refrigeration system including in combination, a primary refrigerant circulating system including a condensing unit and an evaporator, said evaporator comprising a pair of evaporator coils connected in series, a by-pass having a low resistance to the flow of refrigerant around one of said coils, means in said by-passed coil to increase the resistance to the flow of refrigerant therethrough, controllable means in said by-pass to increase the resistance to the flow of refrigerant therethrough so that the resistance of said by-pass is greater than that of said by-passed coil, a secondary refrigerant circulating system having a condenser in heat exchange relation with said by-passed coil, and means responsive to the temperature of said secondary system for rendering said controllable means effective, whereby the primary evaporator will cool the secondary condenser.

6. A refrigerator of the multi-temperature, multi-compartment type, including in combination a low temperature compartment, a food storage compartment, a refrigerant circulating system including a condensing unit and an evaporator arranged to effect cooling of said compartments, said evaporator providing alternative paths for the flow of refrigerant, one of said paths normally having a low resistance to the flow of refrigerant and the second of said paths being formed to have a high resistance to the flow of refrigerant, controllable means for increasing the resistance to the flow of refrigerant through said first path so that it is greater than the resistance of said second path, and means responsive to the temperature of said food storage compartment for rendering said controllable means effective.

7. A multi-temperature refrigeration system of the primary-secondary type, comprising in combination a primary circuit including an evaporator, said evaporator being divided into two portions connected in series, a by-pass around one of said portions, a secondary circuit including a condenser and an evaporator, said condenser being arranged in heat exchange relation with said by-passed portion of mary circuit controlled by the secondary circuit temperature for directing the flow of refrigerant through said by-pass or through said by-passed evaporator portion thereby to control the heat transfer between said primary evaporator and said secondary condenser.

8. A multi-temperature refrigeration system of the primary-secondary type, comprising in combination a primary circuit including an evaporator and a refrigerant condensing unit, said evaporator being divided into two portions connected in series, a by-pass around one of said portions, a secondary circuit including a condenser and an evaporator, said condenser being arranged in heat exchange relation with said by-passed portion of said primary evaporator, means in said primary circuit controlled by the secondary circuit temperature for directing the flow of refrigerant through said by-pass or through said by-passed evaporator portion thereby to control the heat transfer between said primary evaporator and said secondary condenser, and means controlled by the primary circuit temperature for starting and stopping said condensing unit.

9. A multi-temperature refrigeration system of the primary-secondary type, comprising in combination a primary circuit including an evaporator and a refrigerant condensing unit, means controlled by the primary circuit temperature for starting and stopping said condensing unit, said primary evaporator being divided into two portions connected in series, a by-pass around one of said portions, a secondary circuit including a condenser and an evaporator, said condenser being arranged in heat exchange relation with said by-passed portion of said primary evaporator, and means in said primary circuit controlled by the secondary circuit temperature for directing the flow of refrigerant through said by-pass or through said by-passed evaporator portion thereby to control the heat transfer between said primary evaporator and said secondary condenser, said last mentioned means being maintained in an inoperative condition unless said condensing unit is operating.

10. A multi-temperature refrigerator, comprising in combination a low temperature compartment, a refrigerated food storage compartment, said compartments being insulated from each other and from the atmosphere, a primary refrigerant circulating system including an evaporator and a condensing unit, said evaporator being divided into two portions, one of said portions being arranged to cool said low temperature compartment, a secondary refrigerant circulating system including a condenser and an evaporator for cooling said storage compartment, said secondary condenser being arranged in heat exchange relation with said other portion of said primary evaporator, means responsive to the storage compartment temperature for rendering said last-mentioned portion of said primary evaporator effective for cooling said secondary condenser, and means responsive to the freezing compartment temperature for starting and stopping said condensing unit, both of said last mentioned means being arranged so that said storage compartment temperature responsive means is maintained in an inoperative condition unless said condensing unit is operating.

11. A multi-temperature refrigerator, comprising in combination a low temperature compartment, a refrigerated food storage compartment, said compartments being insulated from each other and from the atmosphere, a primary refrigerant circulating system including an evaporator and a condensing unit, said evaporator being divided into two portions, one of said portions being arranged to cool said low temperature compartment, a secondary refrigerant circulating system including a condenser and an evaporator for cooling said storage compartment, said secondary condenser being arranged in heat exchange relation with said other portion of said primary evaporator, said primary circuit including means for rendering ineffective said last mentioned portion, and means responsive to the storage compartment temperature for rendering said last mentioned portion of said primary evaporator effective for cooling said secondary condenser.

12. A multi-temperature refrigerator, comprising in combination a low temperature compartment, a refrigerated food storage compartment, said compartments being insulated from each other and from the atmosphere, a primary refrigerant circulating system including an evaporator and a condensing unit, said evaporator being divided into two portions, the first of said portions being arranged to cool said low temperature compartment, a secondary refrigerant circulating system including a condenser and an evaporator for cooling said storage compartment, said secondary condenser being arranged in heat exchange relation with the second portion of said primary evaporator, operable means for controlling the flow of refrigerant through said second primary evaporator portion, means sensitive to the food storage compartment temperature for operating said refrigerant flow controlling means so that said second primary evaporator portion cools said secondary condenser, and means responsive to the temperature in the low temperature compartment for starting and stopping said condensing unit.

13. A refrigerator of the multi-temperature, multi-compartment type, including in combination, a low temperature compartment, a food storage compartment, a refrigerant circulating system including a condensing unit and an evaporator arranged to effect cooling of said compartments, said evaporator providing alternative paths for the flow of refrigerant, one of said paths normally having a low resistance to the flow of refrigerant and the second of said paths having a high resistance to the flow of refrigerant, controllable means for increasing the resistance to the flow of refrigerant through said first path so that it is greater than the resistance of said second path, means responsive to the temperature of said food storage compartment for rendering said controllable means effective, and means responsive to the temperature of said low temperature compartment for controlling the operation of said condensing unit, both said last mentioned means being interconnected so that the first of said means is not operative unless or until the second of said means starts the operation of said condensing unit.

14. A refrigerator of the multi-temperature, multi-compartment type, including in combination, a low temperature compartment, a food storage compartment, a refrigerant circulating system including a condensing unit and an evaporator arranged to effect cooling of said compartments, said evaporator providing alternative paths for the flow of refrigerant, one of said paths normally having a low resistance to the flow of refrigerant and the second of said paths having a high resistance to the flow of refrigerant, controllable means for increasing the resistance to the flow of refrigerant through said first path so that it is greater than the resistance of said second path, electric circuit means, including a first switch means, energizable in response to the temperature of said food storage compartment for rendering said controllable means effective, and second electric circuit means, including a second switch means, energizable in response to the temperature of said low temperature compartment for controlling the operation of said condensing unit, said electric circuit means being in parallel so that said first circuit means operates to condition said low resistance path for high resistance operation by actuating said controllable means without depending upon the operation of said condensing unit.

15. A refrigerator of the multi-temperature, multi-compartment type, including in combination, a low temperature compartment, a food storage compartment, a refrigerant circulating system including a condensing unit and an evaporator arranged to effect cooling of said compartments, said evaporator providing alternative paths for the flow of refrigerant, one of said paths normally having a low resistance to the flow of refrigerant and the second of said paths having a high resistance to the flow of refrigerant, controllable means for increasing the resistance to the flow of refrigerant through said first path so that it is greater than the resistance of said second path, means responsive to the temperature of said food storage compartment for rendering said controllable means effective, and simultaneously starting operation of said condensing unit and means responsive to the temperature of said low temperature compartment for controlling the operation of said condensing unit.

16. A refrigerator of the multi-temperature, multi-compartment type, including in combination, a low temperature compartment, a food storage compartment, a refrigerant circulating system including a condensing unit and an evaporator arranged to effect cooling of said compartments, said evaporator providing alternative paths for the flow of refrigerant, one of said paths normally having a low resistance to the flow of refrigerant and the second of said paths having a high resistance to the flow of refrigerant, controllable means for increasing the resistance to the flow of refrigerant through said first path so that it is greater than the resistance of said second path, and an electric circuit including means responsive to the temperature of said food storage compartment for rendering said controllable means effective, and means responsive to the temperature of said low temperature compartment for controlling the operation of said condensing unit, both said temperature responsive means being connected in series so that said controllable means is not rendered effective unless or until the condensing unit is operating.

17. A multi-temperature refrigerator including in combination a liner forming a low temperature compartment, a second liner forming a food storage compartment, means insulating said liners from each other and from the atmosphere, a hermetically sealed primary refrigerant circulating system including an evaporator and a condensing unit, said evaporator being divided into two portions, one of said portions being affixed in heat exchange relation to said first liner, a secondary refrigerant circulating system including an evaporator secured in heat exchange relation to said second liner and a condenser, means removably securing said secondary condenser in heat exchange relation to said other portion of said primary evaporator, and means contained in said primary system and controlled in response to the temperature in said food storage compartment for controlling the heat transfer between said last-mentioned portion of said primary evaporator effective and said secondary condenser, said primary system and said first liner being removable from and replaceable into the refrigerator as a unit.

18. A refrigeration system including in combination a condensing unit and an evaporator, said evaporator comprising a pair of evaporator coils connected in series, means connecting said condensing unit with said evaporator coils, a by-pass around one of said coils, said by-pass normally having low resistance to the flow of refrigerant therethrough, means in said by-passed coil to increase the resistance to the flow of refrigerant therethrough, controllable restrictive means in said by-pass to increase the resistance to the flow of liquid refrigerant therethrough so that such resistance of said by-pass is greater than that of said by-passed coil, said restrictive means permitting flow of gaseous refrigerant therethrough, and means in said connecting means for separating gaseous refrigerant from liquid refrigerant so that the gaseous refrigerant will flow through said by-pass when its resistance is increased and liquid refrigerant will flow through said by-passed coil.

19. A refrigeration system including in combination a condensing unit and an evaporator, said evaporator comprising a pair of evaporator coils connected in series, means connecting said condensing unit with said evaporator coils, a by-pass around one of said coils, said by-pass normally having low resistance to the flow of refrigerant therethrough, means in said by-passed coil to increase the resistance to the flow of refrigerant therethrough, controllable restrictive means in said by-pass to increase the resistance to the flow of liquid refrigerant therethrough so that such resistance of said by-pass is greater than that of said by-passed coil, said restrictive means permitting flow of gaseous refrigerant therethrough, and means in said connecting means for separating gaseous refrigerant from liquid refrigerant so that the gaseous refrigerant will flow through said by-pass when its resistance is increased and liquid refrigerant will flow through said by-passed coil, said separating means comprising a loop of tubing in said by-pass.

20. A refrigeration system including in combination a condensing unit and an evaporator, said evaporator comprising a pair of evaporator coils connected in series, means connecting said condensing unit with said evaporator coils, a by-pass around one of said coils, said by-pass normally having low resistance to the flow of refrigerant therethrough, means in said by-passed coil to increase the resistance to the flow of liquid refrigerant therethrough, a restricting valve in said by-pass to increase the resistance to the flow of liquid refrigerant therethrough so that the resistance of said by-pass is greater than that of said by-passed coil, said valve being constructed to permit the flow of gaseous refrigerant when in closed position, and means in said connecting means for separating gaseous refrigerant from liquid refrigerant so that the gaseous refrigerant will flow through said by-pass when its resistance is increased and liquid refrigerant will flow through said by-passed coil.

21. A multi-temperature refrigerator comprising in combination a refrigerator cabinet, a low temperature compartment mounted within said cabinet, a refrigerated food storage compartment mounted within said cabinet, said compartments being insulated from each other and from the atmosphere, said cabinet being sealed against the ingress of air into the insulation containing space, a primary refrigerant circulating system including a condensing unit and an evaporator for cooling said low temperature compartment, a secondary refrigerant circulating system including a condenser and an evaporator for cooling said storage compartment, said secondary system condenser being arranged in heat exchange relation with a portion of said primary evaporator, control means responsive to the food storage compartment temperature for rendering said portion of said primary evaporator effective for cooling said secondary condenser, control means responsive to the low temperature compartment temperature for controlling the operation of said condensing unit, manual adjustment means for each of said control means, said adjustment means having portions projecting out from the insulated space, and means for sealing said manual adjustment means with said cabinet to prevent atmospheric air from leaking into the insulated space.

22. A multi-temperature refrigeration system of the primary-secondary type, comprising in combination a primary circuit including an evaporator and a refrigerant condensing means, said evaporator being divided into two portions connected in series, a by-pass around the first of said portions, a secondary circuit including a condenser and an evaporator, said condenser being arranged in heat exchange relation with said first portion of said primary evaporator, means in said primary circuit controlled by the secondary circuit temperature for directing the flow of refrigerant through said by-pass or through said first portion of said primary evaporator thereby to control the heat transfer between said primary evaporator and said secondary condenser, and means controlled by the temperature of the second portion of said primary evaporator for starting and stopping said condensing means.

EVANS T. MORTON.

REFERENCES CITED

The following references are of record in the file of this patent:

UNITED STATES PATENTS

| Number | Name | Date |
|---|---|---|
| 2,005,860 | Huntington | June 25, 1935 |
| 2,282,342 | Preble | May 12, 1942 |
| 2,292,405 | Reeves | Aug. 11, 1942 |
| 2,301,313 | Money et al. | Nov. 10, 1942 |
| 2,336,418 | Philipp | Dec. 7, 1943 |
| 2,492,648 | McCloy | Dec. 27, 1949 |